MAGNETIC AMPLIFIER

Filed May 31, 1955 3 Sheets-Sheet 1

Inventor
Raymond E. Morgan
By Merton D Moore
His Attorney

Inventor
Raymond E. Morgan
by [signature]
His Attorney

MAGNETIC AMPLIFIER

Filed May 31, 1955

Inventor
Raymond E. Morgan
By Merlin D Moore [signature]
His Attorney

United States Patent Office 2,948,844
Patented Aug. 9, 1960

2,948,844

MAGNETIC AMPLIFIER

Raymond E. Morgan, Schenectady, N.Y., assignor to General Electric Company, a corporation of New York Filed May 31, 1955, Ser. No. 512,007

9 Claims. (Cl. 323—89)

Figure 1:
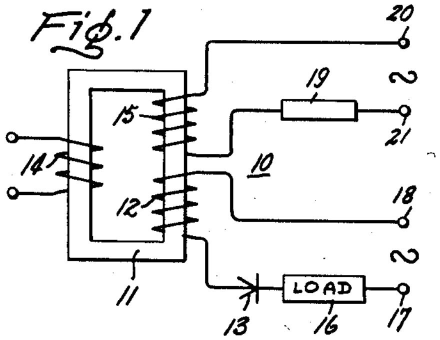

This invention relates to saturable core impedance devices and, more particularly, to such devices known as magnetic amplifiers wherein the output of the device is controlled by controlling the saturation of the core or cores employed.

The field of application of saturable core impedance devices such as the ones contemplated herein has been limited by a number of factors. Such limiting factors include the fact that variations in supply voltage cause variations in load current, the control exerted on the output current by the current in the control windings of the device is not linear over a desired range, the gain on available magnetic amplifiers is not high enough, and the variation in leakage of the rectifiers employed in the circuits effects variations in the output current of magnetic amplifiers operating with low power signals. All of these problems are most acute in magnetic amplifiers acting as regulators and operating at low power levels, such as magnetic amplifiers which are to be utilized for regulating temperatures of less than one degree Fahrenheit variation.

The effect of variations in leakage of the system rectifiers on the load current and the non-linearity of response of the magnetic amplifier (i.e., the non-linearity of the load current with control current) in the zero control current region due to exciting current in the gate windings are factors which most frequently limit the use of magnetic amplifiers in such regulating systems. The non-linearity of response of the magnetic amplifier in the zero control current region occurs due to the fact that some exciting current must flow to supply core losses even when there is no control current. Since this range near zero output current, when the load current does not vary linearly with the signal or control current occurs due to exciting current, it is referred to as the exciting current error.

Leakage of the system rectifiers refers to the fact that present day plate type rectifiers, such as selenium and germanium rectifiers, are not perfect but actually pass a certain amount of current in the reverse direction. This reverse current is commonly called leakage current and when passing through the main windings of a magnetic amplifier is equivalent to a signal of a microwatt or more applied to the control windings. The rectifier leakage current is not usually harmful, but variations in the leakage current cause variations in the output current. Such output variations for a given supply voltage and control signal are undesirable for many applications.

Accordingly, it is an object of this invention to provide saturable core impedance means in which the aforementioned defects may be substantially reduced.

Another object of this invention is to provide means for selectively minimizing the effect of supply voltage variations on the load current, extending the linear range, increasing the gain, or minimizing the variations in load current due to variations in rectifier leakage current of saturable core impedance devices or substantially reducing combinations thereof.

A further object of this invention is to provide a saturable core impedance device which is practical for operation at very low power levels.

Briefly stated, in accordance with this invention, certain improvements in self-saturating magnetic amplifiers are accomplished by providing a bias signal of relatively short pulses in the interval between power pulses in such a manner as to cause operation of the saturable core of the device on the positive or front side of its outer hysteresis loop. This results in improving the linearity of the magnetic amplifier by minimizing variations in load current due to variations in rectifier leakage. Certain other improvements are accomplished by operating the magnetic amplifier from a power supply which also produces an output of relatively short pulses, i.e., of approximately the same duration as the bias signal pulses, with relatively long intervals between pulses. In combination with the pulsed bias, pulsing of the power source results in increasing the sensitivity of the magnetic amplifier by reducing its minimum output current while retaining the linearity gained by pulsing the bias.

Figure 7:
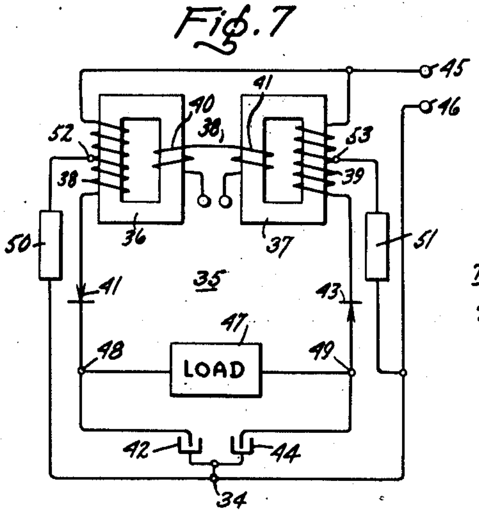
Figure 8:
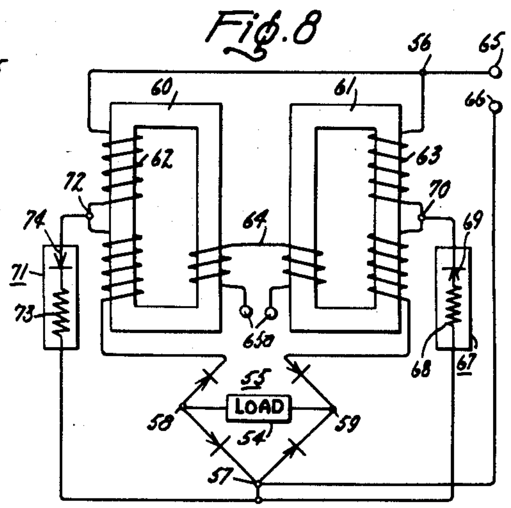
Figure 9:
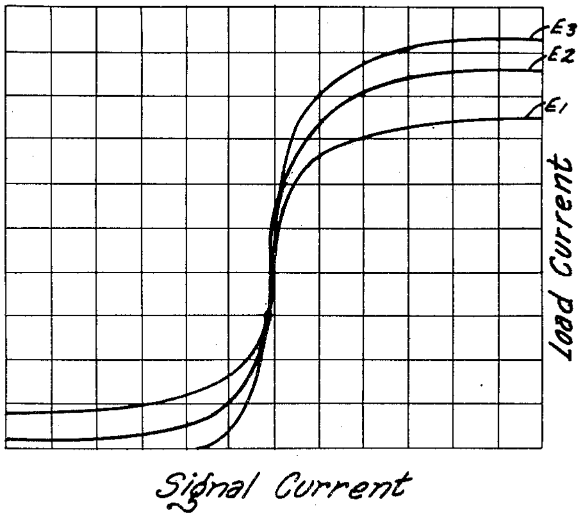
Figure 10:
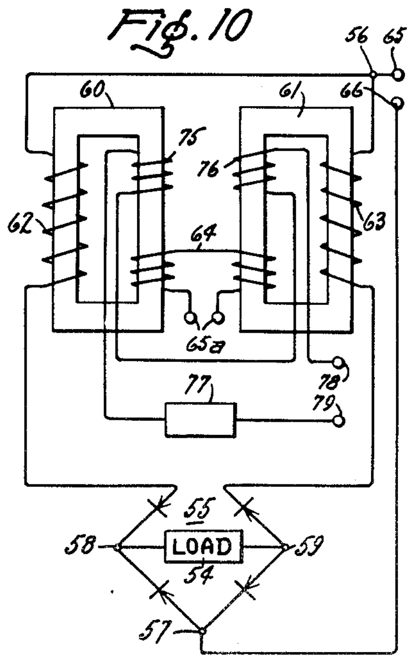

Novel features which are believed to be characteristic of this invention are set forth with particularity in the appended claims. This invention, however, both as to its organization and method of operation, together with further objects and advantages thereof, may best be understood by reference to the following description taken in conjunction with the accompanying drawings, in which:

Figs. 1, 4, 5 and 6 diagrammatically illustrate self-saturating half wave circuits which may be employed in the practice of the present invention;

Figs. 7, 8 and 10 are schematic representations of full wave magnetic circuits which may also utilize the principles of this invention; and Figs. 2, 3, 9, 11, 12 and 13 illustrate various operating characteristics of the circuits shown to aid in the understanding of their operation.

In order to understand the concepts of the present invention, reference should be made to Fig. 1 wherein a single sided, self-saturating half-wave magnetic amplifier 10 which utilizes one aspect of the present invention is diagrammatically illustrated. The magnetic amplifier consists of a magnetic core 11, a main or gate winding 12 on one leg of the core and in flux exchange relationship therewith which carries the load current of the amplifier, a saturating rectifier 13 in series with the main winding, a control winding 14 wound on the magnetic core 11 for determining the saturation of the core in accordance with a control signal applied to the winding, and a bias winding 15 also wound on the magnetic core 11 for the purpose of applying a biasing flux to the core member. In the circuit illustrated, the main power winding 12 and saturating rectifier 13 are connected in series with the load impedance 16 and an alternating current power supply is applied to this series circuit between terminals 17 and 18. An alternating current bias is provided by connecting the biasing winding 15 in series with a current limiting, impedance matching, biasing impedance 19 between alternating current supply terminals 20 and 21.

The main winding 12 will carry load current only on positive half cycles of the alternating current source due to the polarity of the unidirectional current conducting device 13. As previously explained, there will be a certain amount of rectifier leakage current during the negative half cycle of the alternating current source due to the fact that available rectifiers are not perfect. There is, in addition, the possibility that a certain amount of current will flow in the power winding 12 during the negative half cycle of the alternating current source due to the fact that flux level changes in the magnetic core 11 may induce current therein. Also, as previously explained, if the magnetic amplifier 10 has no bias, or if the bias supplied is from a direct current source, the response will not be linear in the zero control current region due to the fact that some exciting current must flow to supply core losses.

With an alternating current bias applied across the series combination of the biasing winding 15 and the biasing impedance 19, the minimum output current may be decreased since the alternating current bias may be made to supply the necessary exciting current. In order to decrease the minimum output current, the combination of the series biasing impedance 19 and the alternating biasing voltage applied between the terminals 20 and 21 must be adjusted so that the voltage across the biasing winding 15 causes the biasing winding to supply ampere turns to the core 11 which is slightly greater than the ampere turns applied by the main power winding 12 due to rectifier leakage current (more fully treated subsequently) flowing therethrough. If, for example, the biasing winding and the power winding 12 have the same number of turns and the same impedance, then at minimum output the alternating biasing voltage must be slightly greater than the voltage across the power winding 12.

The application of such an alternating current biasing voltage, however, does not appreciably affect the flow of actual load current or its control. That is to say, that when a signal is applied to the control winding 14, driving the core 11 toward saturation, the impedance of both the main winding 12 and the biasing winding 15 is reduced considerably. However, in such a circumstance, most of the biasing voltage will appear across the biasing impedance 19 and the biasing impedance will prevent the alternating biasing current from increasing.

Figure 2:
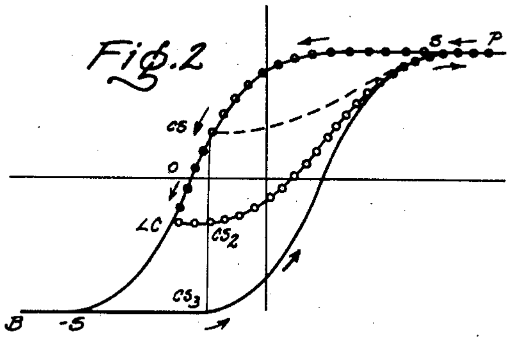

The action of the biasing impedance 19 and the alternating current bias may be more clearly understood by reference to Fig. 2 which represents the dynamic hysteresis loop of a typical ferromagnetic material which might be used as the core 11 in the magnetic amplifier illustrated in Fig. 1. The dynamic hysteresis loop represents a plot of flux density in the core against the external magnetizing force applied to the core when the applied magnetizing force is varied at a finite speed. The finite speed at which the magnetizing force is varied to obtain the dynamic hysteresis loop being considered depends on the frequency of the alternating current source which is applied to the magnetic amplifier under consideration. The area enclosed by the loop is a measure of the core losses of the material at the operating frequency when operation of the circuit takes place around the major loop. The core losses include both hysteresis and eddy current losses.

The point S on the hysteresis loop represents saturation in the positive direction and the point —S represents negative saturation. Assuming that the current in the windings on the core 11 is such that the core is operated on its major loop, it is necessary to cycle the core material around its loop for each cycle of the alternating current power supply. For magnetic amplifiers which do not use an alternating current bias with a biasing impedance such as the impedance 19 of the circuit of Fig. 1, the core material is cycled around its hysteresis loop during each cycle by the ampere turns supplied by the power winding. Hence, the exciting current, i.e., the current necessary to supply hysteresis and eddy current losses, flows in the power winding and load circuit of such magnetic amplifiers even when there is no control current.

Also, from the dynamic hysteresis loop of Figure 2 it is seen that if the biasing impedance 19, the turns on the biasing winding 15, and the magnitude of the alternating current biasing voltage applied between the terminals 20 and 21 are proportioned properly, the magnetizing force of the biasing winding can be made just sufficient to force the flux density of the core 11 from the positive saturation point S back along the backside of the hysteresis loop to the point of negative saturation —S, and then up along the front of the hysteresis loop to the point of positive saturation S. This operation then will be repeated each cycle whether or not a power voltage is supplied. In practice, the alternating current ampere turns is made slightly greater than the amount required to cycle the core material around its hysteresis loop when there is no power voltage being supplied to the main winding since the biasing voltage supplied must prevent the load circuit from supplying a portion of the necessary magnetizing force to prevent excitation current from flowing in the main winding.

Figure 3:
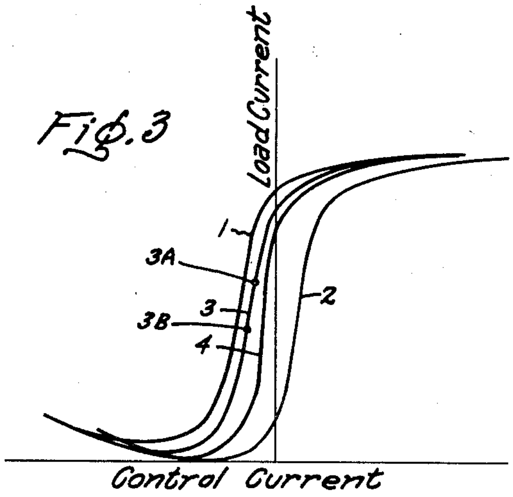

The magnetic amplifier characteristic curves shown in Figure 3 illustrate the effect of the alternating current bias discussed above. The magnetic amplifier characteristic curves represent a plot of the load current supplied by the magnetic amplifier against the signal current flowing in the control or signal winding 14. The curve given the numeral 1 represents the characteristic of an ordinary magnetic amplifier without an alternating current bias. The curve labeled 2 represents the characteristic of the magnetic amplifier with the biasing impedance 19 and alternating biasing voltage adjusted to give a minimum output. From this curve (2), it will be seen that the load current of the magnetic amplifier is substantially zero for approximately a zero signal current applied to the control or signal winding 14.

The results just described may be accomplished by using a pure resistance for the impedance 19. However, the impedance 19 will preferably have a reactive component to achieve the best results.

A different adjustment of the alternating current bias voltage and impedance 19 will render the magnetic amplifier more stable. That is to say, that the output of the magnetic amplifier can be rendered more independent of variations in supply voltage magnitudes and wave shapes and also more independent of variations of magnetic amplifier components such as the variations in the leakage reactance of the rectifiers used.

Once again this condition may be more clearly understood by reference to the dynamic hysteresis loop of Figure 2. Assume that the control signal voltage sets the point of operation or control flux level of the magnetic amplifier core at the point O on the backside of the hysteresis loop, and assume that the power winding is set to swing the flux to the point P which is past positive saturation S. If the alternating current bias is adjusted to swing the flux to the point B which is approximately the same distance below the operating point O set by the signal as the point P (the point to which the power winding swings the flux) is above the operating point O set by the signal, then a change in supply voltage or in any of the magnetic amplifier components will have approximately the same effect on the biasing winding as it does on the main power winding. Therefore, the effect of any such variations will be substantially cancelled. This condition is theoretically true only at one signal; however, it operates in actual practice over about 20 percent of the magnetic amplifier characteristic. This range is adequate, particularly for low level input signals.

The magnetization curve of Fig. 3 which is labelled 3 represents the magnetic amplifier characteristic with the biasing impedance 19 and biasing voltage adjusted to give increased stability. The two points 3A and 3B represent the portion of the characteristic curve within which the signal current may be set for this condition and a stable output obtained. The exact position of curve 3, Fig. 3, will vary with different core materials.

Varying the combination of biasing voltage applied between the terminals 20 and 21 and the impedance 19, it was discovered that a range of such combinations exist where the alternating current bias decreases the minimum output of the magnetic amplifier without changing the maximum value of output current obtainable. This means that there is a range of combinations of bias voltage and impedance where an increased gain is obtained. An explanation has already been given as to why the minimum output current of a magnetic amplifier is decreased but exactly why this may be accomplished without changing the maximum output current is not fully understood. This effect has been observed, however.

The magnetic amplifier characteristic curve of Fig. 3 which is labelled 4 was obtained using a magnetic amplifier with the biasing impedance 19 and biasing voltage adjusted to give increased gain.

Figure 4:
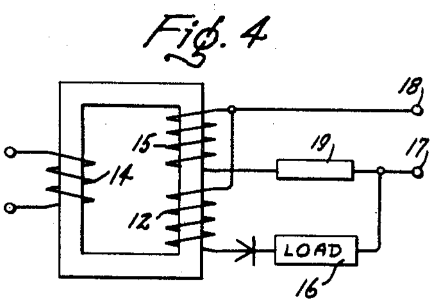

The above discussion has been conducted on the basis of a separate alternating current biasing winding. Since the circuits of Figures 1 and 4 are essentially the same and corresponding components are given like reference numerals, this discussion applies equally well to both circuits. It is not necessary, however, to utilize a separate biasing winding such as the biasing winding 15 in Figures 1 and 4 in order to apply an alternating current bias. The alternating bias may be applied to either a part or all of the alternating current power winding. Circuits utilizing such arrangements are illustrated in Figures 5, 6, 7, and 8.

Figure 5:
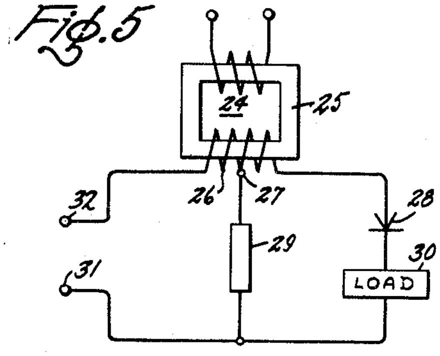

The circuit of Fig. 5 illustrates a single sided, half wave magnetic amplifier 24 which is similar to the half wave circuits of Figs. 1 and 4 except that it uses a tapped main winding so chosen that the alternating current bias may be supplied from the magnetic amplifier supply voltage. The magnetic amplifier utilizes an iron core 25, a main winding 26 having a tap 27 thereon, a saturating rectifier 28 connected in series with the main winding 26, and a biasing impedance 29 which is connected to the tap 27 of the main winding 26. A series circuit which comprises the main winding 26, saturating rectifier 28, and a load device 30 is connected between the terminals 31 and 32 to receive an alternating current supply voltage.

An alternating current bias is provided by connecting the biasing impedance 29 between the tap 27 on the main winding 26 of the half wave magnetic amplifier and the side of the load impedance 30 which is connected to the alternating current supply terminal 31. That is to say that the biasing impedance 29 is connected in parallel with the series circuit which comprises the load impedance 30, the saturating rectifier 28, and the portion of the main winding 26 between the tap 27 and the saturating rectifier 28, and in a series circuit which includes the remaining tapped portion of the main power winding 26 which is connected directly between the power supply terminals 31 and 32. By proper portioning of the biasing impedance 29 and the tapped portion of the main winding 26, any of the output characteristic curves shown in Fig. 3 and previously described may be obtained.

Figure 6:
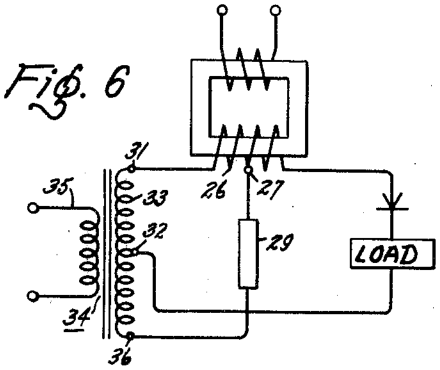

Fig. 6 illustrates another method of supplying the biasing voltage of the single sided, half wave magnetic amplifier illustrated in Fig. 5. The circuit of Fig. 6 has all of the circuit components of the circuit of Fig. 5 and, therefore, in order to simplify the discussion, corresponding circuit components are given the same reference numerals. The difference in the two circuits is in the method of supplying the power and biasing voltages. In the circuit of Fig. 6, the alternating current power supply terminals 31 and 32 are shown as an end terminal and a tap respectively on the secondary 33 of the supply transformer 34 having its primary winding 35 connected across an alternating current source. The biasing impedance 29 in the circuit of Fig. 6 is connected between the tap 27 on the main winding 26 of the magnetic amplifier and the remaining end terminal 36 of the supply transformer secondary winding 33. This figure simply illustrates one of the many methods of utilizing a common voltage source to supply the power for the magnetic amplifier and a biasing voltage other than the main supply voltage. This supply connection may be utilized for any of the circuits illustrated and described herein.

A voltage doubler magnetic amplifier utilizing alternating current bias is illustrated in Fig. 7. The particular circuit used for this illustration is shown and described in United States Patent 2,552,203, and which is issued in the name of Raymond E. Morgan, May 8, 1951, and assigned to the assignee of the present invention. Although this circuit is the one used to illustrate the application of alternating current bias to voltage doubler magnetic amplifiers, it is to be particularly understood that the bias may be applied in the same manner to conventional voltage doublers. The full wave magnetic amplifier of Fig. 7 may be considered as two single sided, half wave magnetic amplifiers as illustrated in Fig. 5, i.e., two single-sided, half wave magnetic amplifiers utilizing part of the main windings for the alternating current bias. It is to be understood, however, that the alternating current bias may also be supplied by means of separate biasing windings.

The voltage doubler magnetic amplifier 35 is provided with two similar core members 36 and 37 which have their center legs separated by a small air gap 38 for the reasons set forth in the Patent 2,552,203 previously referred to. Since the position of the cores is critical only due to the particular type of voltage doubler circuit illustrated, it is to be understood that such a relationship is not limiting when applied to other types of magnetic amplifiers. Each of the magnetic cores 36 and 37 is provided with main reactor windings 38 and 39 respectively wound thereon. Signal windings 40 and 41 are wound on the cores 36 and 37 respectively for the purpose of controlling the saturation of the magnetic cores in accordance with an applied signal.

The main reactor winding 38 is connected in a series circuit which also includes a saturating rectifier 41 and a capacitor 42. The main winding 39 is connected in a series circuit which includes a saturating rectifier 43 and a capacitor 44. The two series circuits which include the main windings are connected in parallel with each other and between the alternating current voltage supply terminals 45 and 46. A load impedance 47 is connected between the two series circuits to terminals 48 and 49 which are located between the saturating rectifier and capacitor of each circuit.

In order to supply the alternating current bias for each of the core members 36 and 37, a pair of biasing impedances 50 and 51 are connected between taps 52 and 53 on the respective main windings and the junction or terminal 34 to which the capacitors 42 and 44 are connected. That is to say, that the baising impedance 50 is connected in parallel with the series circuit which includes a tapped portion of the main winding 38 on the core 36, saturating rectifier 41, and capacitor 42. The biasing impedance 51 is connected in parallel with the series circuit which includes a tapped portion of the main winding 39 on the magnetic core 37, the saturating rectifier 43, and capacitor 44. It will be noted that the saturating rectifiers 41 and 43 are oppositely poled so that the main windings will conduct on alternate half cycles of the alternating current supply voltage as is usual in full wave voltage doubler circuits.

The circuit of Fig. 8 illustrates the application of an alternating current bias to a full wave bridge magnetic amplifier. As the name implies, the magnetic amplifier consists of a full wave bridge rectifier 55 having input terminals 56 and 57 and output terminals 58 and 59, a pair of magnetic core members 60 and 61, main windings 62 and 63, and control winding 64 having input terminals **65*a* to receive a control signal. The main winds 62 and 63 are connected in two adjacent legs of the full wave bridge rectifier 55 which are connected to the common input terminal 56. The supply voltage is applied between the supply terminals 65 and 66 which are connected directly to the input terminals 56 and 57 of the full wave bridge rectifier 55, and a load device 54 is connected between the output terminals 58 and 59**.

In order to supply a biasing voltage for the magnetic core 61, a series circuit comprising a biasing impedance 67 is connected between a tap 70 on the main winding 63 and the input terminal 57 of the full wave bridge rectifier. The biasing impedance 67 as shown includes the series combination of a series resistance 68 and a plate type rectifier 69. The rectifier 69 is poled in such a manner that current will flow in the upper tapped portion of the main winding 63 on both half cycles of the alternating current supply. In a like manner, a biasing voltage is applied to the core member 60 by means of a biasing impedance 71 connected between a tap 72 on the other main winding 62 and the input terminal 57 on the full wave rectifier. The biasing impedance 71 also includes a resistor 73 and a plate type rectifier 74 connected in series. The use of the rectifiers 69 and 74 and the biasing impedance 67 and 71 respectively renders the biasing impedances non-linear. This arrangement may be utilized when a large amount of biasing current is desired.

Once again, it is pointed out that although a particular biasing arrangement is shown, other means could be utilized to obtain the same effect and that other types of biasing impedances could be used without departing from the present invention.

Figure 9 illustrates the output characteristic curves obtained using the circuit of Figure 8 with the biasing impedances 67 and 71, tapped portions of the main windings 62 and 63, and the alternating current supply voltage proportioned to stabilize the output of the magnetic amplifier. The characteristic curves show a plot of the load current against the signal current for three different values of supply voltage. An inspection of the three curves $E_1$, $E_2$, and $E_3$ obtained using progressively larger magnitudes of supply voltage from $E_1$ to $E_3$ show that the characteristic curves are not shifted to the right (i.e., in the direction of positive signal current) by an equal amount but are shifted upwardly in such a manner that portions of each curve fall one on top of the other so that for a considerable portion of the characteristic curves, a variation in supply voltage will not cause a change of load current. As previously pointed out, a different adjustment of the biasing impedances and biasing windings will give increased gain or minimum output for zero signal current depending upon the particular adjustment made.

Figure 10 illustrates a full wave magnetic amplifier which is provided with all of the circuit components that the full wave bridge circuit of Figure 8 utilizes with the exception that it is provided with separate biasing windings 75 and 76 which are connected in series with each other and a current limiting biasing impedance 77 across a pair of terminals 78 and 79 which are adapted to receive a biasing voltage. The other components of the circuit of Figure 10 are given the same reference numerals as the corresponding components of the circuit of Figure 8 for simplicity.

The proper proportioning of the biasing impedance 77 and number of turns on the biasing windings 75 and 76 may be used to achieve any of the results previously described with respect to the circuit of Figure 8; however, further improvement in the characteristic of the amplifier may be obtained by operating magnetic amplifier on the positive or outer side of its major hysteresis loop. This improvement is directed at eliminating variations in the output of magnetic amplifier which are caused by variations in leakage current of the system rectifiers. In order to understand this concept, reference should again be made to the dynamic hysteresis loop of Figure 2. Under normal operating conditions, most magnetic amplifiers do not operate around the full dynamic hysteresis loop for the reason that the cores are generally not driven from positive to negative saturation. The core material is generally operated on a minor loop which may be represented by the loop shown with the small circular coordinate markers.

Assuming that the full load current for the magnetic amplifier has been flowing and the core material was driven to some point P past positive saturation, as the alternating current supply voltage drops to zero, the magnetizing force is reduced and the saturation of the magnetic amplifier core material is reduced to a point CS which is set by the control signal. In other words, as magnetizing force is reduced, the level of the flux density in the core material drops to a point CS as set by the ampere turns supplied by the control winding. If there were no rectifier leakage current, the flux density level of the core would remain at the point CS until the next positive cycle of the alternating current source wherein the density of the flux in the core would rise along the dashed line from CS to S as indicated. The loop enclosed by the circular coordinate markers between positive saturation S and the point CS and the dash line from the point CS to the positive saturation point S represent a minor hysteresis loop.

Since the rectifiers used are not perfect and do conduct some current in the negative or blocking direction, the flux density of the core material will be forced down past the flux density level set by the control signal to some point LC on the backside of the hysteresis loop. At the end of the negative half cycle of the power supply voltage, the rectifier leakage current stops flowing, and the flux in the core settles to the point $CS_2$ as determined by the control signal. When the positive half cycle of the power supply voltage again occurs, the flux density of the core rises from the point $CS_2$ along the circular coordinate markers to the positive saturation point S and on out to the point P as determined by the full load output current. Thus it is seen that the rectifier leakage current causes the reactor core to operate on a different minor hysteresis loop than the one around which it would operate if there were no leakage current.

The rectifier leakage current itself would not be too harmful if it were constant because it could then be predicted. However, variations in leakage current cause the core material to operate on different minor hysteresis loops and, therefore, cause variations in the output current. Variations in rectifier leakage current are particularly undesirable when operating with low power signals since the leakage current may be equivalent to a signal of a microwatt or more.

The effect of rectifier leakage current can be eliminated entirely if the core material is operated on the positive or outer side of its major hysteresis loop. This may be accomplished by providing a reset pulse voltage on a biasing winding, such as, by the application of a reset pulse voltage between supply terminals 78 and 79 for the biasing windings 75 and 76 in the circuit of Figure 10. In order to accomplish this, a flux reset pulse is applied during the negative half cycle of the power supply voltage to provide magnetizing force to drive the flux density in the core to the negative saturation point —S. An impedance such as the impedance 77 is used in series with the windings to which the reset pulse is applied so that the core material will not be driven into negative saturation.

The reset pulse is applied wholly before the end of the negative half cycle and terminates a brief time interval before the commencement of the next succeeding positive power pulse to allow time for the flux in the core material to return or settle back from the negative saturation point —S to the point $CS_3$ on the positive side of the hysteresis loop as set by the control signal on the control winding. During the final flux settling time, the only effect of the rectifier leakage current is to retard the time for the flux to settle. It does not affect the final flux point, unless the time allowed is too short.

With minor circuit adaptations, the reset pulse principle can be applied to any of the circuits shown and described herein as well as to saturable core impedance devices which utilize other circuit connections. The use of a separate flux reset pulse has been the most successful method of resetting the core material to operate on the positive or outer side of the major hysteresis loop.

A further improvement in the operation of the magnetic amplifier 10 may be made by using a pulse power supply wherein the shape of the applied voltage wave is such that the ratio of the duration to the interval between pulses is relatively low (less than 1/2). In such a case, during the time that the flux is traveling from the negative saturation point −S (Fig. 2) to the point $CS_3$ on the positive side of the hysteresis loop as set by the control signal, there will be no voltage from the power supply, so that the only voltage across the system rectifiers is that which is induced in the main winding by the settling of the flux. After the flux settles, there is no voltage and no leakage. This provides means of eliminating the effect of rectifier leakage where the leakage is too great to be eliminated by the use of a flux reset pulse biasing signal.

It is practical to utilize the pulse power supply and a flux reset pulse in circuits for amplifying signals less than a microwatt and wherein the output of the amplifier is in the range of 100 milliwatts or less. This is actually the range of signal and output powers where such a circuit is desirable since circuits operating within this range of control signals and outputs are, generally speaking, the only circuits wherein the variations in rectifier leakage are troublesome.

The above descriptions of operation are all based upon the dynamic hysteresis loop of a single core, and consequently, are directed to half wave circuits. It will be understood, however, that the full wave magnetic amplifiers such as those illustrated in Figures 7, 8, and 10 will operate as two half wave circuits in accordance with the description.

The flux reset or biasing pulse may be applied through a control winding. However, it is undesirable to induce the reset pulse voltage in the control signal winding in most cases, and therefore, a construction as illustrated in Fig. 10 is preferred wherein the reset pulse is applied full wave. The flux reset pulse may have any appropriate wave shape provided the magnetic amplifier design is coordinated. It will be understood by persons skilled in the art that a unidirectional pulse per reactor leg could be used, if desired, and that the flux reset windings could be wound on the same core legs as the main or power windings.

Figure 11:
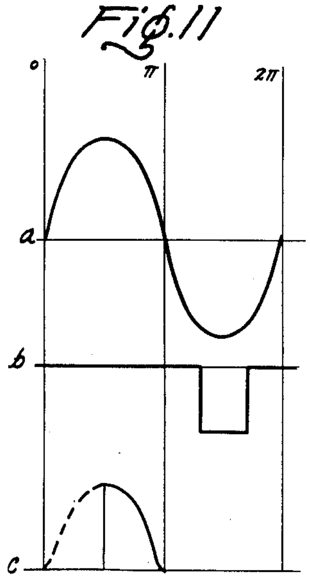
Figure 12:
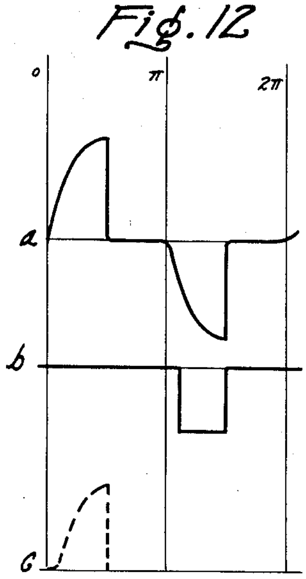

Figs. 11 and 12 illustrate voltage and current wave shapes for various circuits utilizing the flux pulse reset principle when the magnetic amplifier under consideration is energized from a pulse power supply.

The curves of Fig. 11 were obtained across the various windings of one core of the circuit of Fig. 10 with a sine wave power supply applied between the power supply terminals 65 and 66. The curve (*a*) shows a full cycle of the sine wave power supply voltage applied; the curve (*b*) shows the flux reset pulse which is utilized to reset the flux in the core; and the curve (*c*) shows the maximum output obtainable in dashed lines and the minimum output current obtainable in solid lines. From the curves of Fig. 11*c*, it may be seen that the minimum output current is relatively high. This condition occurs due to the fact that the duration of the flux reset pulse is less than a full cycle and, therefore, cannot hold off the power winding voltage for a full cycle. Obviously, it is undesirable in many applications to utilize a circuit with such a high minimum output current.

As may be seen from the curves of Figure 12, the condition is improved considerably by providing a pulse power supply voltage, such as illustrated in Fig. 12*a*, which has a low ratio of pulse duration to repetition period (substantially lower than 1/2). The curve of Fig. 12*b* again shows the wave shape of the flux reset pulse voltage applied to the biasing winding, and the curve C of Fig. 12 shows the wave shape of the maximum output current in dotted line but does not show a wave shape of minimum output current since the minimum output current can be reduced to zero under the conditions considered here. The reason for this is, of course, that if the power supply voltage pulse is made of substantially the same duration as the flux reset pulse voltage, then the flux reset pulse voltage can hold off the output current flowing in the main winding.

Figure 13:
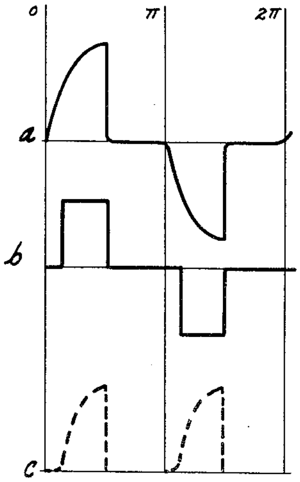

Fig. 13 illustrates the curves taken for the full wave magnetic amplifier utilizing a pulse power supply with a pulsed bias or flux reset. The wave shape of the power supply voltage as shown in Fig. 13*a* is the same as that in Fig. 12*a* and the wave shape of the pulse flux reset voltage shown in Fig. 13*b* is the same as that shown in Figs. 11*b* and 12*b*, except that it is applied full wave. The curve of Fig. 13*c* illustrates the wave shape of the maximum and minimum output currents obtainable. The maximum output current wave is shown in dash line and once again the minimum output current is zero. Thus from the curves of Fig. 13, it may be seen that the minimum output current may be made zero for a full wave magnetic amplifier circuit by utilizing both a pulse power supply and a full wave pulse flux reset voltage in which the pulses supplied by each to a single core structure are of relatively short duration compared to the interval between power pulses.

While particular embodiments of this invention have been shown, it is to be particularly understood that many modifications, both in the circuit arrangements and in the instrumentalities employed, may be made without departing from the scope thereof. Any such modifications as fall within the true spirit and scope of this invention are, therefore, intended to be covered in the appended claims.

What I claim as new and desire to secure by Letters Patent of the United States is:

1. A magnetic amplifier comprising: a magnetic core member; a power winding in magnetic flux exchange relationship with said core member; a current rectifier connected in series with said power winding; a source of periodically varying electrical currents connected in series with said power winding, said current rectifier and a load device for delivering unidirectional power pulses to said power winding capable of driving said core member into positive saturation; a control winding in flux exchange relationship with said core member for governing the control level of the magnetic flux in said core; a bias winding in flux exchange relationship with said core member; means for supplying electrical flux reset pulses of relatively short duration to said bias winding during the period between said unidirectional power pulses, said flux reset pulses being of sufficient magnitude to drive said core to negative saturation and terminating a brief time interval before the commencement of the next succeeding power pulse to permit the flux in said core member to return to a control flux level set by said control winding, whereby succeeding power pulses operate said core member wholly on one side of its major hysteresis loop.

2. A magnetic amplifier comprising: a magnetic core member; a power winding in magnetic flux exchange relationship with said core member; a current rectifier connected in series with said power winding; a source of periodically varying electrical currents connected in series with said power winding, said current rectifier and a load device for delivering intermittent unidirectional power pulses to said power winding capable of driving said core member into positive saturation, said power pulses being of relatively short duration compared to the interval between pulses; control means for governing the control level of the magnetic flux in said core member; biasing means for supplying said core member with magnetic flux reset pulses of relatively short duration wholly during the periods between said unidirectional power pulses, said flux reset pulses being of sufficient magnitude to drive said core to negative saturation, whereby succeeding power pulses operate said core member wholly on one side of its major hysteresis loop.

3. A magnetic amplifier comprising: a magnetic core member; a power winding in magnetic flux exchange relationship with said core member; a current rectifier connected in series with said power winding; a source of periodically varying electrical currents connected in series with said power winding, said current rectifier and a load device for delivering unidirectional power pulses to said power winding capable of driving said core member into positive saturation; control means for governing the control level of the magnetic flux in said core; biasing means for supplying to said core member magnetic flux reset pulses of relatively short duration during the periods between said unidirectional power pulses, said flux reset pulses being of sufficient magnitude to drive said core to negative saturation and terminating a brief time interval before the commencement of the next succeeding power pulse to permit the flux in said core member to return to a control flux level set by said control winding, whereby succeeding power pulses operate said core member wholly on one side of its major hysteresis loop.

4. A saturable core impedance device comprising at least one magnetic core member, control winding means in flux exchange relationship with said magnetic core member for controlling the saturation thereof, winding means including at least one electrical winding in flux exchange relationship with said magnetic core member, a unidirectional current conducting device, and a load device, said unidirectional current conducting device and said load device being connected in series with said one winding, means for applying to said winding means periodic supply voltage pulses through said unidirectional current carrying device and said load device and periodic biasing voltage pulses, said supply voltage pulses and said biasing voltage pulses being relatively short compared to the repetition period, said biasing voltage pulses being supplied in the intervals between said supply voltage pulses and in flux opposing direction thereto, said biasing voltage pulses terminating a brief time interval before the initiation of the next succeeding supply voltage pulses.

5. A saturable core impedance device comprising at least one magnetic core member, control winding means in flux exchange relationship with said magnetic core member for controlling the saturation thereof, winding means including at least one electrical winding in flux exchange relationship with said magnetic core member, a unidirectional current conducting device, and a load device, said unidirectional current conducting device and said load device being connected in series with said one winding, means for applying to said winding means periodic supply voltage pulses through said unidirectional current carrying device and said load device and periodic biasing voltage pulses, said supply voltage pulses and said biasing voltage pulses having durations of substantially less than half the repetition period, said biasing voltage pulses being supplied in the intervals between said supply voltage pulses and in flux opposing direction thereto, said biasing voltage pulses terminating a brief time interval before the initiation of the next succeeding supply voltage pulses.

6. A saturable core impedance device comprising at least one magnetic core member, control winding means in flux exchange relationship with said magnetic core member for controlling the saturation thereof, winding means including at least one electrical winding in flux exchange relationship with said magnetic core member, a unidirectional current conducting device, and a load device, said unidirectional current conducting device and said load device being connected in series with said one winding, means for applying to said winding means periodic supply voltage pulses through said unidirectional current carrying device and said load device and periodic biasing voltage pulses, said biasing voltage pulses being relatively short compared to the intervals between said supply voltage pulses, said biasing voltage pulses being supplied in the intervals between said supply voltage pulses and in flux opposing direction thereto, said biasing voltage pulses terminating a brief time interval before the initiation of the next succeeding supply voltage pulses.

7. A self-saturating magnetic amplifier comprising a saturable magnetic core having first and second windings in flux exchange relation with said core, a load circuit including a unidirectional current conducting device connected in series with said first winding, means including a pulse power supply connected in series with said load circuit for delivering unidirectional voltage pulses to said first winding having a duration substantially less than one half the interval between said pulses, means for supplying a control voltage to said second winding to control the amount of current passed to said load circuit by said first winding as a result of said voltage pulses from said pulse power supply, and biasing means for supplying magnetic flux reset pulses to said core during the intervals between and in a flux opposing direction to the fluxes resulting from said first winding voltage pulses, said flux reset pulses being of sufficient magnitude to drive said core to saturation and terminating a sufficient time interval before the commencement of the next succeeding voltage pulse delivered to said first winding to permit the flux in said core to return to a control flux level set by the control current in said second winding.

8. A self-saturating magnetic amplifier comprising a saturable magnetic core having first and second windings in flux exchange relation with said core, a load circuit including a unidirectional current conducting device connected in series with said first winding, means including a pulse power supply connected in series with said load circuit for delivering unidirectional voltage pulses to said first winding, means for supplying a control voltage to said second winding to control the amount of current passed to said load circuit by said first winding as a result of said voltage pulses from said pulse power supply, and biasing means for supplying magnetic flux reset pulses to said core during the intervals between and in a flux opposing direction to the fluxes resulting from said first winding voltage pulses, said flux reset pulses being of sufficient magnitude to drive said core to saturation and terminating a sufficient time interval before the commencement of the next succeeding voltage pulse delivered to said first winding to permit the flux in said core to return to a control flux level set by the control current in said second winding.

9. A self-saturating magnetic amplifier comprising a saturable magnetic core having first and second windings in flux exchange relation with said core, a load circuit including a unidirectional current conducting device connected in series with said first winding, means including a pulse power supply connected in series with said load circuit for delivering unidirectional voltage pulses to said first winding, means for supplying a control voltage to said second winding to control the amount of current passed to said load circuit by said first winding as a result of said voltage pulses from said pulse power supply, and biasing means for supplying magnetic flux reset pulses to said core during the intervals between and in a flux opposing direction to the fluxes resulting from said first winding voltage pulses, said flux reset pulses being of sufficient magnitude to drive said core to saturation; said flux reset pulses between relatively short compared to the interval between said voltage pulses and terminating a sufficient time interval before the commencement of the next succeeding voltage pulse delivered to said first winding to permit the flux in said core to return to a control flux level set by the control current in said second winding.

(References on following page)

References Cited in the file of this patent

UNITED STATES PATENTS

| | | |
|---|---|---|
| 2,731,521 | Crawford | Jan. 17, 1956 |
| 2,776,380 | Andrews | Jan. 1, 1957 |

FOREIGN PATENTS

| | | |
|---|---|---|
| 228,534 | Switzerland | Nov. 16, 1943 |

OTHER REFERENCES

"Magnetic Amplifier Circuits," by W. A. Geyger, Jan. 29, 1954, McGraw-Hill.